US006603567B1

(12) United States Patent
Itoh et al.

(10) Patent No.: US 6,603,567 B1
(45) Date of Patent: Aug. 5, 2003

(54) CONTAINER FOR RECORDING MEDIUM, PRINTING APPARATUS, AND PRINTING METHOD

(75) Inventors: Taichi Itoh, Hirakata (JP); Akira Takeoka, Neyagawa (JP); Hidemi Sasaki, Asaka (JP); Yutaka Aoki, Asaka (JP)

(73) Assignees: Panasonic Communications Co., Ltd., Fukuoka (JP); Fuji Photo Film Co., Ltd., Tokyo (JP)

( * ) Notice: Subject to any disclaimer, the term of this patent is extended or adjusted under 35 U.S.C. 154(b) by 0 days.

(21) Appl. No.: 09/310,345

(22) Filed: May 12, 1999

(30) Foreign Application Priority Data

Jun. 16, 1998 (JP) ........................................ 10-168734

(51) Int. Cl.[7] ............................................ G06K 15/00
(52) U.S. Cl. ...................................... 358/1.14; 358/1.1
(58) Field of Search ................................ 358/1.1, 1.12, 358/1.13, 1.14, 1.15, 1.6, 404, 444; 399/25, 9, 131; 346/262, 224, 264

(56) References Cited

U.S. PATENT DOCUMENTS 5,212,512 A * 5/1993 Shiota ........................ 396/612

FOREIGN PATENT DOCUMENTS

JP 61213169 9/1986

OTHER PUBLICATIONS

English language abstract of JP 61–213169, Sep. 22, 1986 Shigemitsu.

* cited by examiner

*Primary Examiner*—Arthur G. Evans
(74) *Attorney, Agent, or Firm*—Greenblum & Bernstein, P.L.C.

(57) ABSTRACT

A plurality of sheets of photofixed-recording medium are stacked on top of each other and stored in a cartridge. An EEPROM is attached to the cartridge. The EEPROM is connecting to a memory connection section. A central processing unit is connected to the memory connecting section. The central processing unit can write information to the EEPROM of the cartridge or read information therefrom. Access to EEPROM can be correctly obtained only when the cartridge is properly inserted into a printing apparatus.

9 Claims, 13 Drawing Sheets

CONTAINER FOR RECORDING MEDIUM, PRINTING APPARATUS, AND PRINTING METHOD

BACKGROUND OF THE INVENTION

1. Field of the Invention

The present invention relates to a container for a recording medium in which recording medium, particularly thermo-sensitive and photosensitive recording medium are airtightly contained. The present invention also relates to a printing apparatus using the above container and its printing method.

2. Description of the Related Art

As described in Publication of Unexamined Japanese Patent Application Sho-No. 61-213169, there is developed thermo-sensitive recording medium in which color forming layers of cyan, magenta, and yellow are laminated on a subs t rate. Micro capsules that contain color forming agents are dispersed in each color-forming layer. In this thermo-sensitive recording medium, chromophoric thermal energy differs depending on each color-forming layer. Since thermal energy is thus different from layer to layer, the color forming layer can be selectively color-formed. Then, to avoid re-printing an upper layer before the printing is executed to a lower layer after executing the printing to the upper layer, the following processing is executed. More specifically, the printed color layer is irradiated with light, for example, ultraviolet rays, with a wavelength peculiar thereto, so as to carry out fixing processing. This processing is called a photofixing. A printing system using such the photosensitive recording medium is called a thermo-autochrom system.

Unlike the conventional sublimation-thermal transfer printing system, in the above thermo-autochrom system, since the recording medium itself color-forms, it is unnecessary to prepare the other ink ribbon, ink cartridge, etc. Also, a protection layer is formed on the uppermost layer, thereby developing resistance to influence from an outer section.

However, photofixed-recording medium must be stored in a lightproof bag as being photosensitized under a fluorescent lamp. Also, the photofixed-recording medium requires careful handling when being set to a printer.

Moreover, in the photofixed-recording medium, its property and the printing characteristic vary, depending on an amount of water. For this reason, thermal sensitivity and image density to be obtained at a printing time differ, depending on external environment before printing, particularly, the degree the photofixed-recording medium is exposded to high or low moisture. Moreover, this worsens conveyance in a printing apparatus.

To solve the above problem, a cartridge is known having a light-shielding characteristic that isolates the material from light and moisture. However, the cartridge itself is regarded as waste, and this reduces the merits in which no ink ribbon is needed as compared with the sublimation-thermal transfer printing system. For this reason, it is desired that the cartridge have some other value or use to justify its expense.

Moreover, when the recording medium is contained in the cartridge, a user cannot determine the remaining quantity of the recording medium and the paper size thereof at a glance since it is difficult to view the recording medium from the outer section.

Also, if the cartridge is not attached to a proper position of a printing apparatus, the paper will not feed properly, an image may be obliquely printed. In order to prevent this problem, cartridge position detecting means is provided in the printing apparatus, and re-attachment of the cartridge is required to the user. As such position detecting means, for example, a push-button switch and a photo sensor are used. However, this results in an increase in cost.

SUMMARY OF THE INVENTION

A first object of the present invention is to provide a container for a recording medium, which is capable of storing information, and which is capable of detecting whether or not a normal attachment is performed.

A second object of the present invention is to provide a printing apparatus, which is capable of normally attaching a container for a recording medium, and which is capable of carrying out printing by use of information stored in the container for a recording medium.

A third object of the present invention is to provide a printing method, which is capable of normally attaching a case for a recording medium, and which is capable of carrying out printing by use of information stored in the container for a recording medium.

The above object can be achieved by a container for containing a recording medium having: a containing body for containing a recording medium; storage stores data and attached to the containing body; and a data inputting/outputting section inputs and outputs data to the storage.

The above object can be achieved by an apparatus for printing an image on a recording medium, having: an attaching section to which the container described above is attached; a data processing section performs at least one of data reading and data writing to the storage through the data inputting/outputting section; a printing section for printing the image on the recording medium; and a detecting section for detecting whether or not the container is normally attached, depending on whether or not the data processing section obtains access to the storage.

The above object can be achieved by an apparatus for printing an image on a recording medium, having: an attaching section to which the container described above is attached; a data reading section for reading a printing condition from the storage through the data inputting/outputting section; and a printing section for carrying out printing in accordance with the printing condition.

The above object can be achieved by a method for printing an image on a recording medium including: determining whether or not access to storage attached to a containing body for containing the recording medium of a container can be obtained; and printing the image when access can be obtained.

The above object can be achieved by a method for printing an image on a recording medium including storing a printing condition to storage attached to a containing body for containing the recording medium of a container; reading the printing condition when the container is attached to a printing apparatus; and printing the image in accordance with the printing condition.

The above object can be achieved by a method for printing an image including: storing information of a recording medium to storage attached to a containing body for containing the recording medium of a container; and reading the information when the container is attached to a printing apparatus.

The above object can be achieved by a method for printing an image comprising: storing a printing content to storage attached to a containing body for containing the recording medium of a container; and reading the printing content so as to be printed when the container is attached to a printing apparatus.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

First to fourth embodiments will be specifically described with reference to the accompanying drawings.

First embodiment

Figure 1:
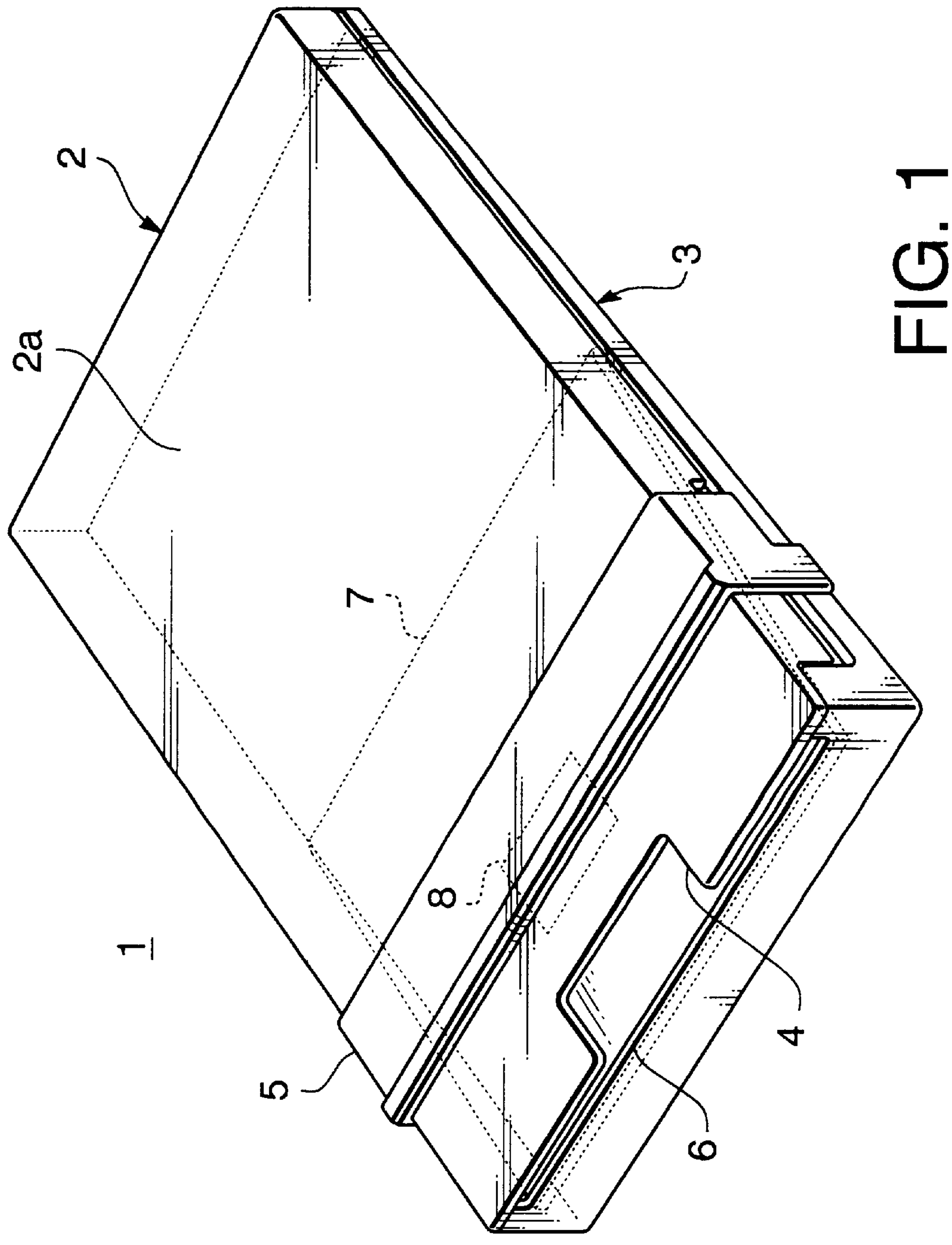
FIG. 1 is a schematic view showing a cartridge according to a first embodiment of the present invention.

FIG. 1 is a schematic view showing a cartridge according to a first embodiment of the present invention.

A cartridge 1 is a tightly closed housing having an upper side member 2 and a lower side member 3. The upper side member 2 and the lower side member 3 are plastic moldings.

An opening portion 4 is formed at substantially the center of a front end portion of a ceiling plate 2*a* of upper side member 2. From the opening portion 4, a transferring roller of a printer is inserted into an interior of the cartridge 1 when the cartridge is mounted the printer. Moreover, a shutter 5 that opens and closes the opening portion is attached to be freely slidable on the ceiling plate 2*a*.

Also, a slit 6 through which photofixed-recording paper (hereinafter simply referred to as recording paper) passes is formed on an upper end of a front end portion of the lower side member 3. A plate-like lifter 7 is attached to a bottom portion of the lower side member 3 to freely move up and down. Moreover, a through hole 8 through which a lifting lever to be described later projects is formed on a lower side of the lifter 7.

The cartridge 1 has an Electrical Erasable Programmable Read Only Memory (hereinafter referred to as EEPROM) as nonvolatile storing means. The cartridge 1 also has a data inputting/outputting section, which electrically connects EEPROM to the printer so as to read and write information.

In the cartridge 1, sheets of recording paper are stacked on top of each other. The cartridge 1 blocks sufficient light to prevent photofixing. The cartridge 1 is also moisture-proof and has low water permeability such that an amount of water contained in the recording paper is unchanged. More specifically, it is preferable that the cartridge 1 should be formed of black plastic having a light-shielding characteristic and that the opening portion 4 thereof should be of to minimum size.

Figure 2:
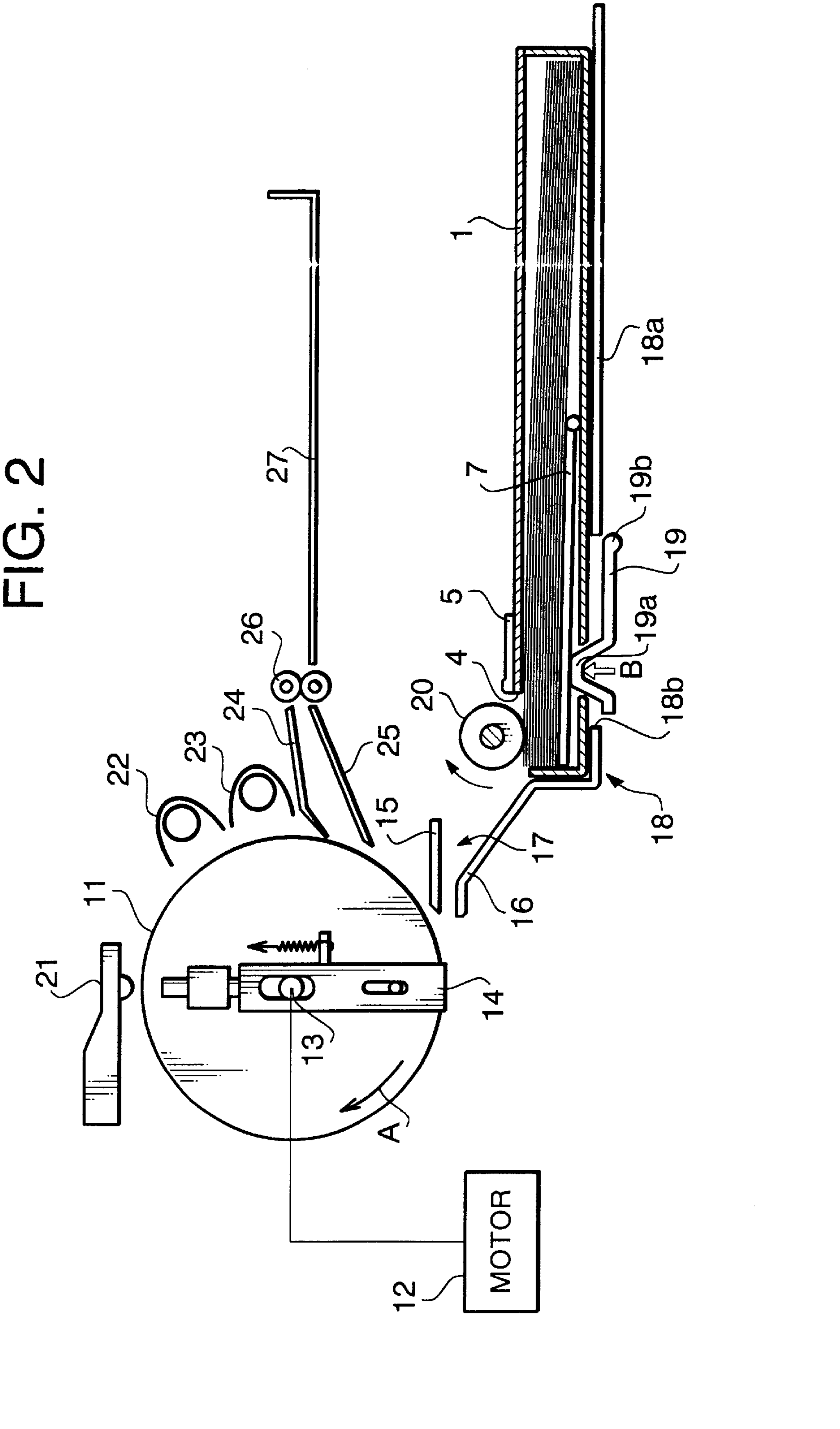
FIG. 2 is a schematic view showing a printer according to the first embodiment of the present invention.

FIG. 2 is a schematic view showing a printer according to the first embodiment of the present invention. In FIG. 2, reference numeral 11 is a platen drum, which is substantially cylindrical and rotatable to a direction of an arrow A by a motor 12. A clamp member 14 is fixed to a shaft 13.

In the vicinity of the lowermost portion of the platen drum 11, guide plates 15 and 16 are arranged. The guide plates 15 and 16 form a paper feeding path 17. A cartridge attaching section 18 where the cartridge is set is formed at an entrance side of the paper feeding path 17. In the cartridge attaching section 18, an opening portion 18*b* is formed on a bottom plate 18*a* that supports the cartridge 1. A lift lever 19 is provided on a bottom surface side of the bottom plate 18. A top end portion 19*a* of the lift lever 19 projects through the opening portion 18*b* to an inner side of the cartridge 1. The lift lever 19 is structured to be rotated in a direction of an arrow B by an elastic member (not shown) such that an axis 18*b* is a fulcrum.

Moreover, a transferring roller 20 is provided at opening portion 4 in an opened state at the time of mounting the cartridge 1. A thermal head 21, a photofixing unit 22 for yellow and a photofixing unit 23 for magenta are sequentially arranged along the rotational direction of the platen drum 1. At the subsequent stage of the photofixing unit 23 for magenta, a separation claw 24 and a discharge guide plate 25 are provided. A pair of transferring rollers is provided in the direction of the separation claw 24 and the discharge direction of the discharge guide plate 25. A tray 27 is provided as a discharge side of the pair of the transferring rollers 24.

Figure 3:
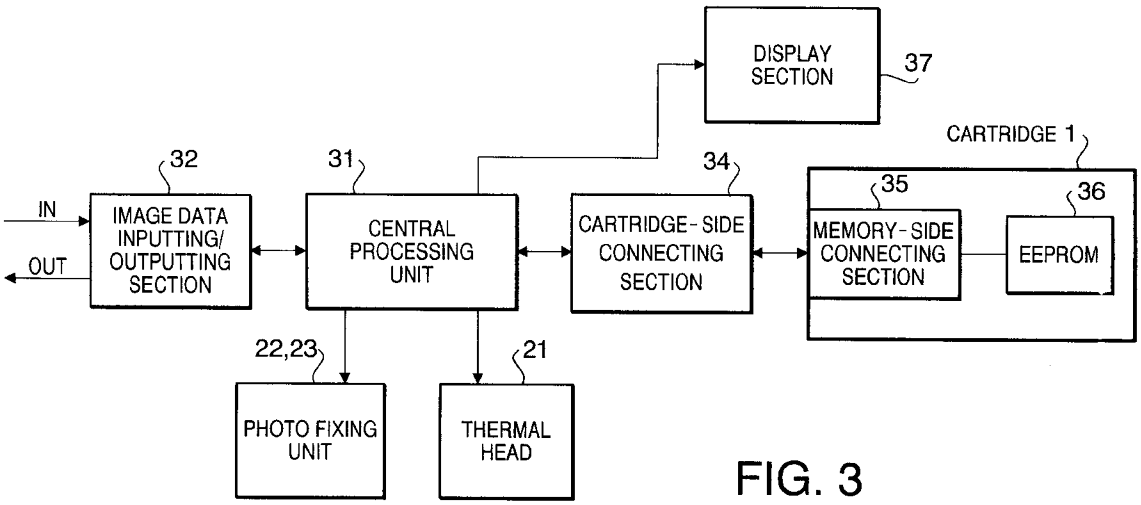
FIG. 3 is a block diagram showing the printer according to the first embodiment of the present invention.

FIG. 3 is a block diagram showing a printer 30 according to the first embodiment.

A central processing unit 31 carries out a plurality of processing and controls of the respective sections. More specifically, thermo-sensitive print processing using the thermal head 21, photofixing processing using the photofixing unit 22 for yellow and the photofixing unit 23 for magenta, the control of transferring a photofixed-recording medium, and reading using EEPROM are carried out under the controls of the central processing unit 31.

An image data inputting/outputting section 32 is an interface for inputting/outputting an image data signal to/from the central processing unit 31.

A printer-side connecting section 34, which is connected to a cartridge-side connecting section 35 provided in the cartridge 1, reads or writes information from/to an EEPROM 36. The printer-side connecting section and the cartridge-side connecting section 35 comprises electrodes or the like.

A display section 37, for example, a liquid crystal display, displays various kinds of information.

By the aforementioned configuration, the central processing unit 31 can write information to EEPROM 36 of the cartridge 1 or read information therefrom. Whereby, the cartridge 1 is capable of storing information, information can be put to use as explained below.

For example, the number of recording sheets in cartridge 1 can be written to EEPROM 36. When the user sets the cartridge 1 to the cartridge attaching section 18, the number of recording sheets is read from EEPROM 36 and displayed on the display section 37. This advises the user of the number of sheets even if the user cannot look into the interior of the cartridge 1.

Also, it is possible to write the size of the recording paper (for example, A5, B6, etc.) to EEPROM 36. When the cartridge 1 is set to the cartridge attaching section 18, the printer 30 reads the paper size from EEPROM 36 and displays it on the display section 37, so that the user can be notified of the paper size.

Moreover, it is possible to write the remaining amount of recording paper to EEPROM 36. When the user sets the cartridge 1 to the cartridge attaching section 18 next time, the printer 30 reads the remaining amount of recording paper from EEPROM 36 and displays it on the display section 37. Thereby, the user can know the remaining amount of recording paper even if the user cannot look into the interior of the cartridge. It should be noted that the sheets number of recording paper to be used might be written to EEPROM 36 in place of the remaining number of sheets of recording paper.

Moreover, it is possible to write product information such as paper types, e.g., date of manufacture, paper size, etc., to EEPROM 36 at a shipping time. When the cartridge 1 is set to the cartridge attaching section 18, the printer 30 reads the product information from EEPROM 36 and displays it on the display section 37. Whereby, the user can be notified of the product information, and operation control can be automatically selected in accordance with the product information.

In a case where EEPROM 36 has a large memory capacity, the entire printed image or the part can be written to EEPROM 36. In this case, the printer 30 writes the image as it is, or the printer 30 converts the image to a thumb- nail format and writes the converted image to EEPROM 36. Also, the printer 30 can write the edited image. This allows the printer 30 to read the image printed in the past from EEPROM 36 as required, and print the image. Therefore, since the used cartridge 1 can be used as an image printing medium, the used cartridge 1 is not regarded as waste.

Here, the image writing may be arbitrarily performed by the user's selection. However, the printed final image may unconditionally stored in EEPROM 36.

Moreover, printing conditions can be stored in EEPROM 36 in advance at the shipping time. If the cartridge 1 is set to the cartridge attaching section, the printer 30 reads the printing conditions, and executes the print processing in accordance with the printing conditions. The printing condition is, for example, thermal energy. Also, a set value may be directly stored as a printing condition. A code corresponding to the set value may also be stored to be determined by the printer 30. This eliminates the need for the user to set the printing condition.

Moreover, a different printing condition can be provided to each cartridge 1, so that the image can be automatically printed with a different image quality. More specifically, the printing conditions of various kinds of image qualities such as a sepia mode that prints an image with a sepia quality, a portrait mode that prints an image with quality to be adapted for a portrait, a sharp mode that prints an image with quality placing emphasis on an outline are written to EEPROM 36. Then, various kinds of cartridges 1 are prepared in accordance with the object, and set to the printer 30, so that the image can be automatically printed with a target image quality.

On the other hand, the cartridge 1 has the cartridge-side connecting section 35 for inputting and outputting data from/to EEPROM 36. For this reason, the central processing unit 31 of the printer 30 can recognize whether or not the cartridge 1 is correctly set to the cartridge attaching section 18, depending on whether or not EEPROM 36 can be normally accessed.

If access to EEPROM 36 can be obtained, the central processing unit 31 judges that the cartridge 1 is placed at normal position, and allows the printing. On the other hand, if access to EEPROM 36 cannot be normally obtained, the central processing unit 31 judges that the cartridge 1 is not set at the normal position, and displays a message such as "paper is not correctly set" on the display section 37 to urge the user to check the cartridge 1. More specifically, the central processing unit 31 outputs a read command to EEPROM 36 at a print starting time. If there is a response, the central processing unit 31 executes print processing. If there is no response, the central processing unit 31 executes error display processing. This eliminates the need for preparing a dedicated position detecting means, thereby reducing the cost of the device.

As explained above, according to the cartridge 1 according to the first embodiment, information can be stored in the cartridge and can be put to use, and the position detection is carried out, so that the paper jam and the print error can be prevented.

Second embodiment

Figure 4:
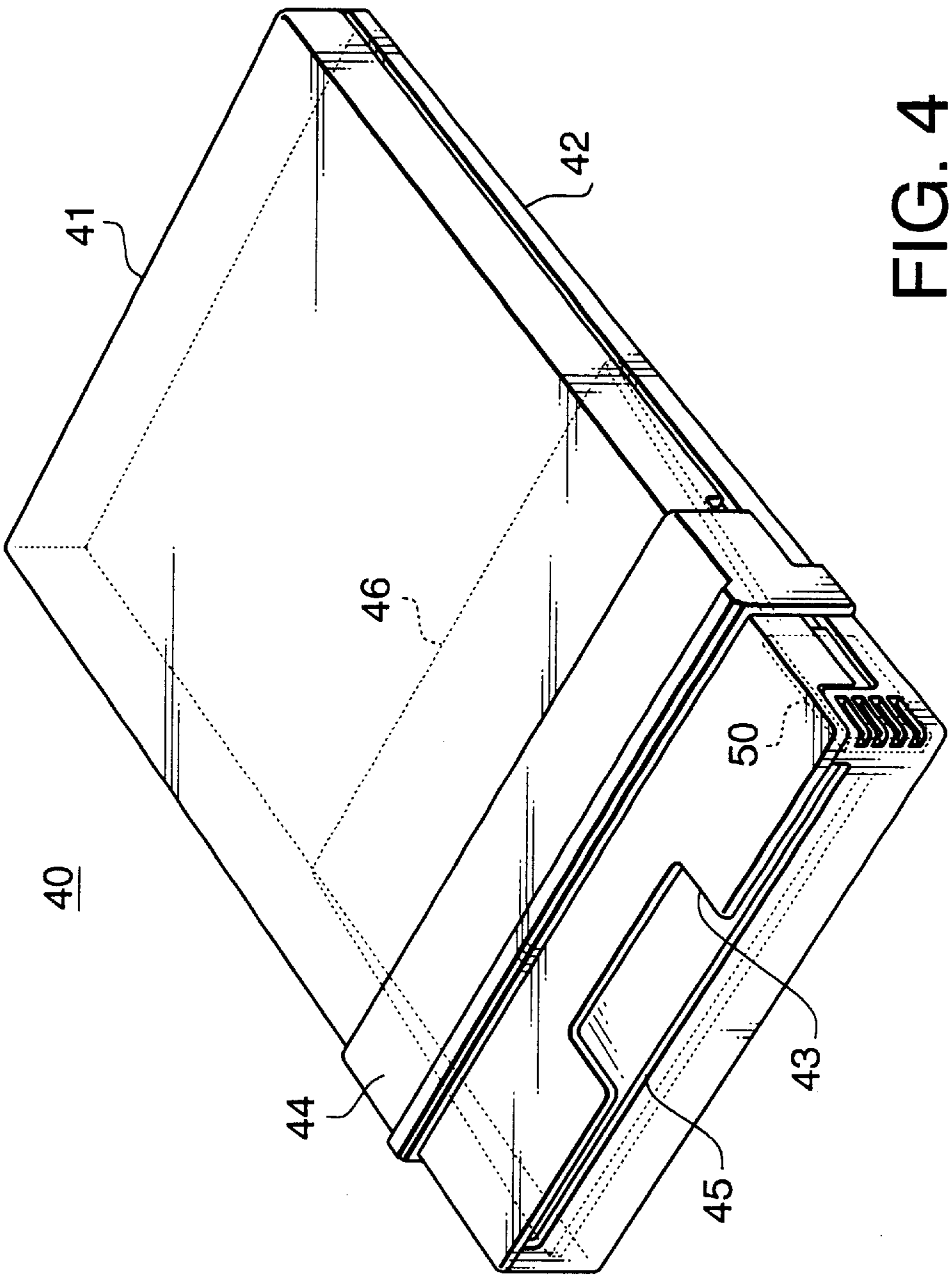
FIG. 4 is a perspective view showing a cartridge according to a second embodiment of the present invention.

Next, a cartridge having electrodes formed on the side surface portion will be explained. FIG. 4 is a perspective view showing a cartridge according to a second embodiment of the present invention.

A cartridge 40 is a housing having an upper side member 41 and a lower side member 42. The upper side member 41 and the lower side member 42 form a containing space that contains a photofixed-recording medium therein.

An opening portion 43 is formed at substantially the center of a front surface portion of an upper surface portion of the upper side member 41. A shutter 44 that opens and closes the opening portion 43 is attached on the upper surface portion of the upper side member 41 to be freely slidable.

A slit 6 (as in FIG. 1) through which recording paper passes is formed on an upper end of a front end portion of the lower side member 42. A plate-like lifter 46 is attached to a bottom portion of the lower side member 42 to freely oscillate.

An information storing section 50 is attached to either front corner of the cartridge 40.

Figure 5:
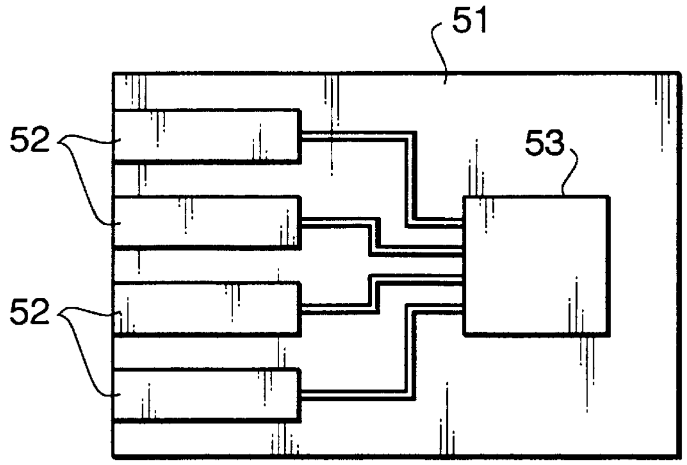
FIG. 5 is a plan view showing information storing section provided in the cartridge according to the second embodiment of the present invention.

As shown in FIG. 5, the information storing section 50 comprises a film-like substrate 51, a plurality of electrodes 52 (four in this embodiment) arranged on the substrate 51, and an EEPROM chip 53 connected to these electrodes 52.

Next, the following will specifically explain the structure of the cartridge 40 and the attachment of the information printing section 46 with reference to FIG. 6 to FIG. 9.

Figure 6:
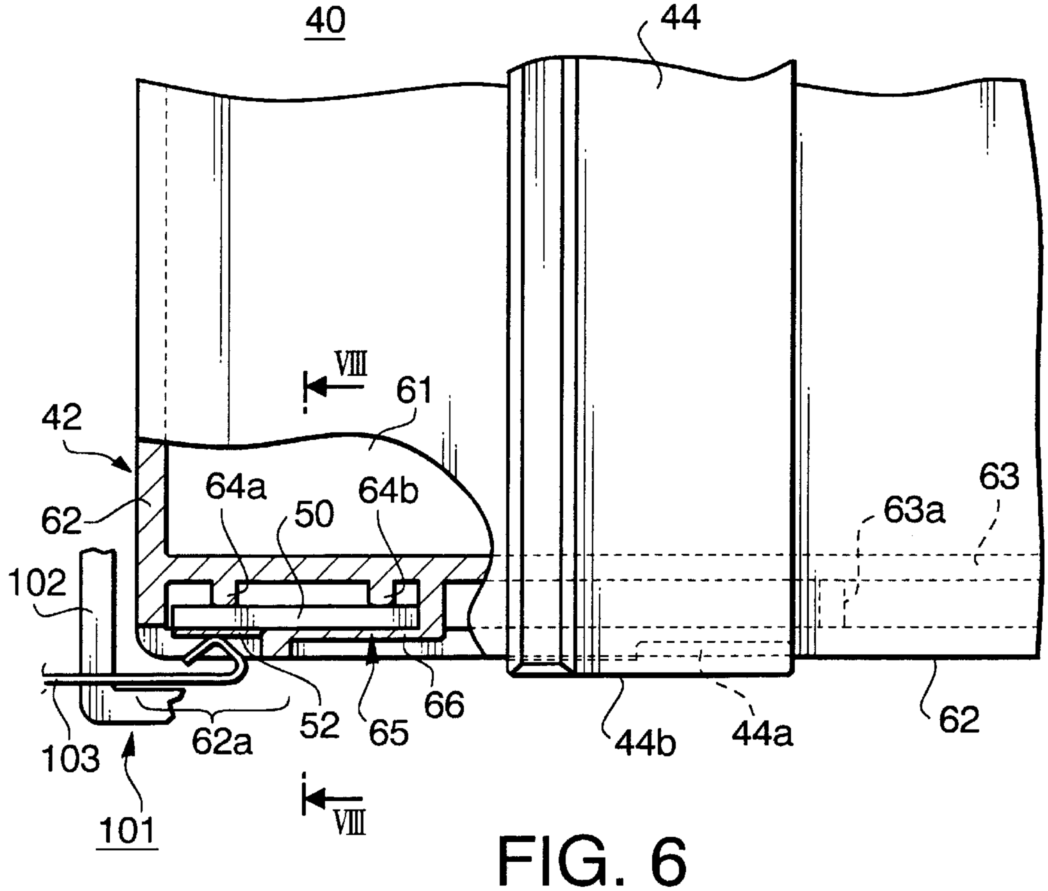
FIG. 6 is a partial plan view showing the cartridge according to the second embodiment of the present invention.
Figure 7:
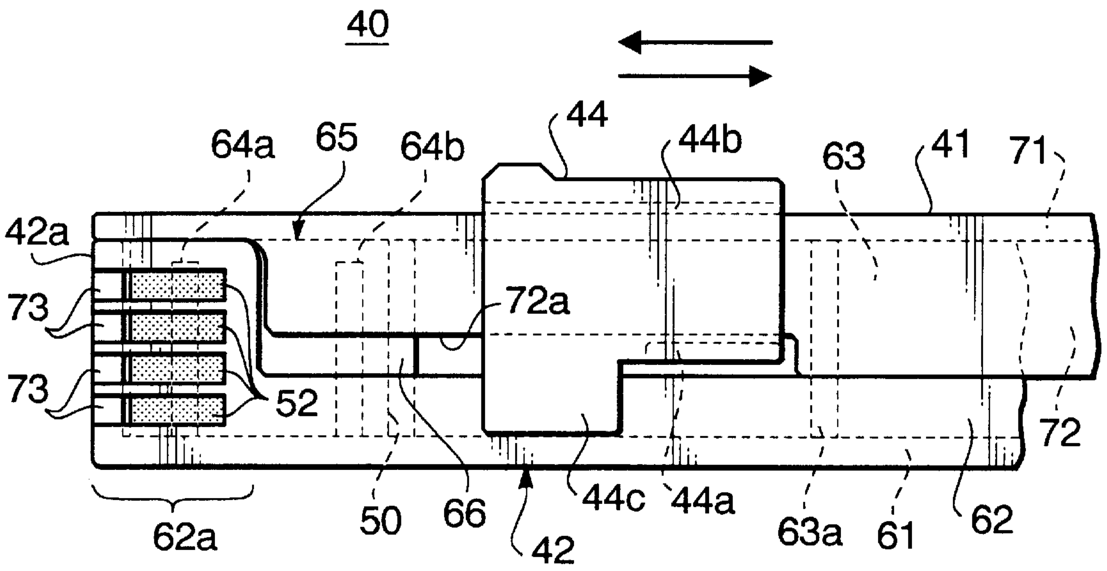
FIG. 7 is a partial side view showing the cartridge according to the second embodiment of the present invention.
Figure 8:
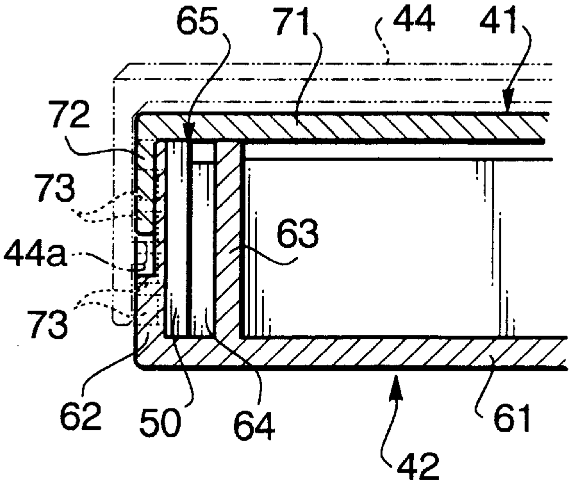
FIG. 8 is a vertical cross sectional view taken substantially along the lines VIII—VIII of FIG. 6.

FIG. 6 is a partial plan view showing the cartridge according to the second embodiment of the present invention. FIG. 7 is a partial side view showing the cartridge according to the second embodiment. FIG. 8 is a vertical cross sectional view taken substantially along the lines VIII—VIII of FIG. 6.

In the lower side member 42, an outer wall 62 is uprightly formed along an outer edge of a plate-like bottom plate 61. Also, at both side edge portions of the bottom plate 61, an inner wall 63 is uprightly formed along an inner side than the outer wall 62. The inner wall 63 comes in contact with a back face of a ceiling plate 71. The height of the outer wall 62 adjacent the inner wall 63 is lower than that of the inner wall 63, specifically about ⅓ to ½ of the height of inner wall 63. An outer wall 72 is formed along both side edge portions of the ceiling plate 71. An end surface of the outer wall 72 comes in contact with that of the outer wall 62 of the lower side member 42. Contact portion between the inner wall 63 and the ceiling plate 71 and the contact portion between the outer wall 62 and the outer wall 72 can be bonded by adhesion or fusion to improve the air-tightness of the contact portions.

In the outer wall 72 of the upper side member 41, the range where the shutter 44 slides is notched, and a guide rail **72*a* is formed between the outer wall 72 and the outer wall 62 of the lower side member 42. A guide 44*a*, which is formed at the lower end portion of both side wall portions of the shutter 44, is engaged with the guide rail 72*a* so as to restrict the moving direction of the shutter 44 and to prevent the detachment of the shutter 44. Moreover, a partition wall 63*a* is formed along the vertical direction of the inner wall 63 to interrupt the flow of air from the guide rail 72*a***.

Next, the structure of the attaching portion of the information storing section 50 will be explained. As shown in FIG. 7, two ribs **64*a*, 64*b* for attaching the information storing section 50 are vertically formed on the front side end portion of the inner wall 63 of the lower side member 42**.

An electrode cover portion **62*a* is provided at the front side end portion of the side surface portion of the outer wall 62 of the lower side member 42 at the same level as the inner wall 63. On the electrode cover portion 62*a*, there are formed insertion grooves 73 to which contacts on the printer side are inserted during mounting. The insertion grooves 73 are extend from a front surface 42*a* of the lower side member 42 to at least the electrodes 52 along the inserting and discharging directions of the cartridge 1. The insertion grooves 73 are formed by notching the electrode cover portion 62*a* along its entire length. In other words, the insertion grooves 73 are recessed from the surface of the electrode cover 62*a*. The respective insertion grooves 73 are formed at substantially regular interval along the direction of the height of the cartridge 40**, and are substantially parallel with each other.

Moreover, a stopper 66 for preventing the substrate 51 of the information storing section 50 from moving backward is provided at the back portion than the rear side rib **64*b* of two ribs 64*a*, 64*b***.

By the aforementioned structure, an attaching portion 65 of the information storing section 50 is formed. The attachment of the image storing section 50 to the attaching portion 65 can be established by the following way. More specifically, the information storing section 50 is inserted between the electrode cover portion **62*a* and the inner wall 63 along the ribs 64*a* and 64*b*. Thereafter, the lower side member 42 is covered with the upper side member 41**.

Figure 9:
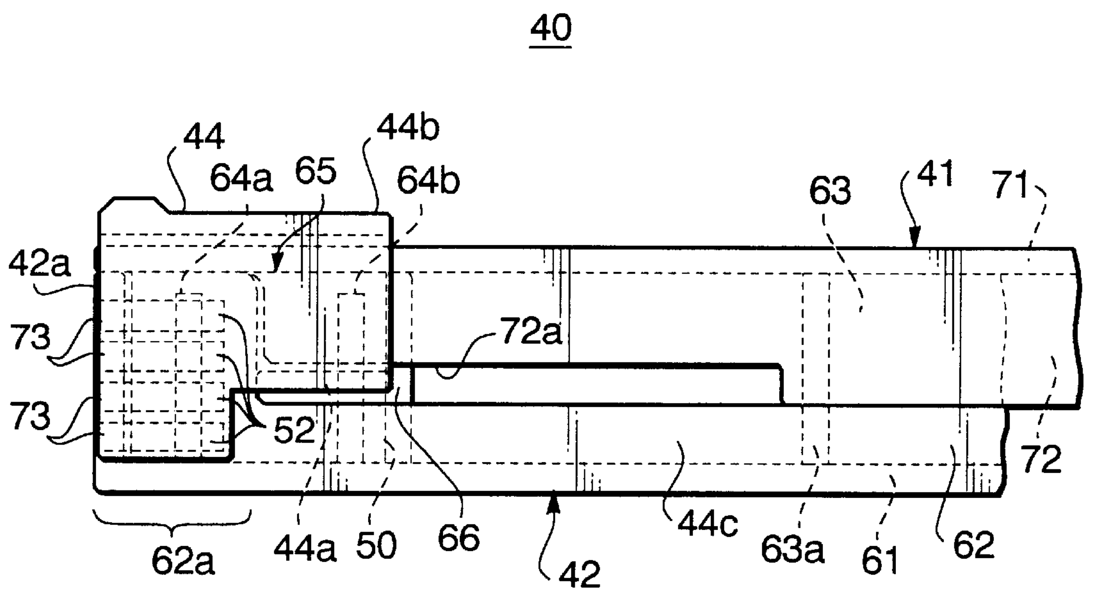
FIG. 9 is a partial side view showing the cartridge according to the second embodiment in a state that a shutter is closed.

A part **44*c* of the front side of side wall portion 44*b* of the shutter 44 is widened as shown in FIG. 9 to cover the electrodes 52 when the shutter 44** is at the closed position.

As shown in FIG. 6, a plurality of contact points 103 (four in this embodiment) is attached to a front wall portion 102 of a cartridge attaching section 101 of the printer. The contact points 103 have a spring that elastically deform. These contact points 103 are electrically connected to the central processing unit 31 as shown in FIG. 3. When a cartridge 40 is inserted to the cartridge attaching section 101 at the deepest position, the contact points 103 come in contact with the electrodes 52 so as to obtain electrical continuity.

As explained above, the cartridge 40 according to the second embodiment has a double structure in which the outer walls 62, 72 and the inner wall 63 are provided. This prevents air and water from coming into the cartridge easily. Particularly, in the second embodiment, the contact portion between the outer wall 72 of the upper side member 41 and the outer wall 62 of the lower side member 42 and the contact portion between the inner wall 63 of the lower side member 42 and the inner surface of the ceiling plate 71 of the upper side member 41 are different from each other in the height, and they are formed in a staggered configuration. As a result, the path that water must travel from the outer section to reach the inner section is quite long. Then, even if water enters from the contact portion on the outer wall side, takes to reach the inner side of the inner wall 63 provides a degree of moisture resistance.

The attaching portion 65 of the information storing section 50 is provided between the electrode cover portion **62*a* and the inner wall 64. For this reason, in a cartridge assembling process, storing section 50 self aligns during insertion into the attaching portion 65 of the lower side member 42 before the lower side member 42 is covered with the upper side member 41. Thereafter, the lower side member 42 is covered with the upper side member 41, and the information storing section 50** is set at the correct position. This makes eases automatization of assembly.

As shown in FIG. 9, the insertion grooves 73 are formed at the position where they are covered with the shutter 44 when in the closed position. This protects the electrodes 52 from dirt and static electricity.

The insertion grooves 73 extend from the front surface **42*a* of the cartridge 40 to at least the electrodes 52 along the inserting and discharging directions. The insertion grooves 73 are recessed from the surface of the outer wall 62. For this reason, the contact points 103 on the printer side easily enter as compared with the case in which the opening portion is simply formed on the side surface portion of the cartridge 40** to expose the electrodes.

Also, the contact points of the spring structure are arranged at a position where they are flexible at the connecting time so as to obtain a pressing force due to its elasticity. For this reason, if the opening portion is simply formed on the side surface portion of the cartridge 40 to expose the electrodes, the surface of the outer surface portion of the front surface side is higher than the contact points, the contact points are made flexible more than necessary. Moreover, the contact points are inserted as being in contact with the surface of the outer wall 62 with high pressure. As a result, the contact points are liable to deteriorate.

In contrast, according to the second embodiment, since the insertion grooves 73 are recessed from the surface of the outer wall 62, flexibility of the contact points 103 generated during insertion is relatively reduced, so that the contact pressure can be restrained. This results in an increase in life of the contact points 103 on the printer side. Particularly, as described in the second embodiment of the present invention, the insertion grooves 73 are formed by notching the electrode cover portion 62*a* along its entire length. For this reason, the face with which the contact points 103 come in contact at the front end portion of the insertion grooves 73 is substantially flush with the electrodes. For this reason, flexibility of the contact points 103 generated during insertion becomes substantially the same as the case in which the contact points 103 come in contact with the electrodes 52. This can prevent extra stress from being applied to the contact points 103 by the attachment and detachment of the cartridge 40.

Third embodiment

Figure 10:
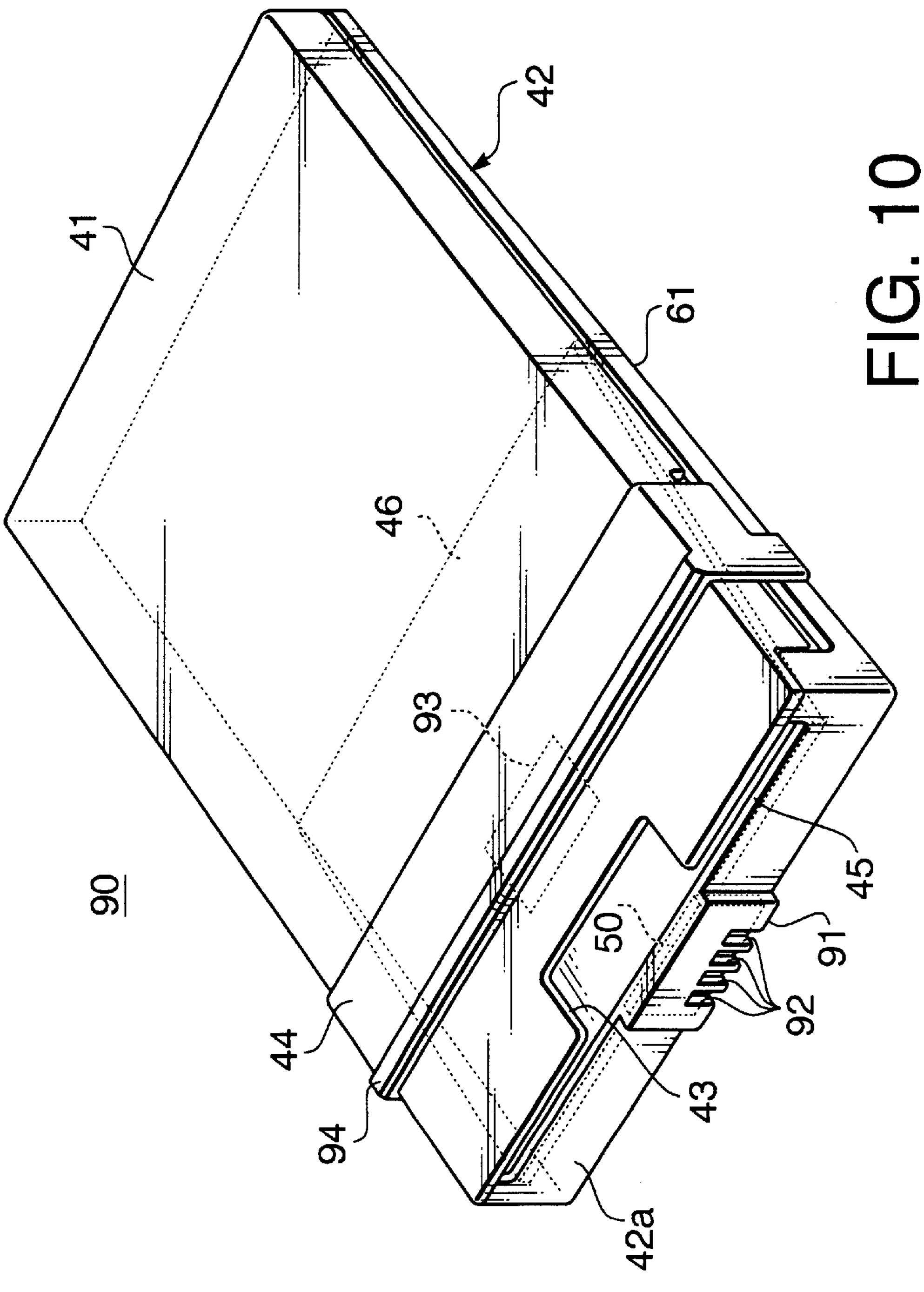
FIG. 10 is a perspective view showing a cartridge according to a third embodiment of the present invention.

Next, the following will explain the cartridge having the electrodes of the information storing section on the front surface portion. FIG. 10 is a perspective view showing a cartridge according to a third embodiment of the present invention. The same reference numerals are added to the portions common to the second embodiment, and the explanation is omitted.

An attaching portion 91, which is forwardly molded in a convex form, is provided at substantially the central portion of the front surface portion 42*a* of the lower side member 42 of the cartridge 90. The information storing section 50 is inserted to the attaching portion 91.

A through hole 93 which the lift lever for lifting the lifter 46 enters is provided at the portion, which is the bottom plate 61 of the upper side member 42 and is the lower side of the lifter 46.

Also, a convex portion 94 is formed at the foremost portion of the upper surface of the shutter 44 along the entire length of the shutter 44.

Figure 11:
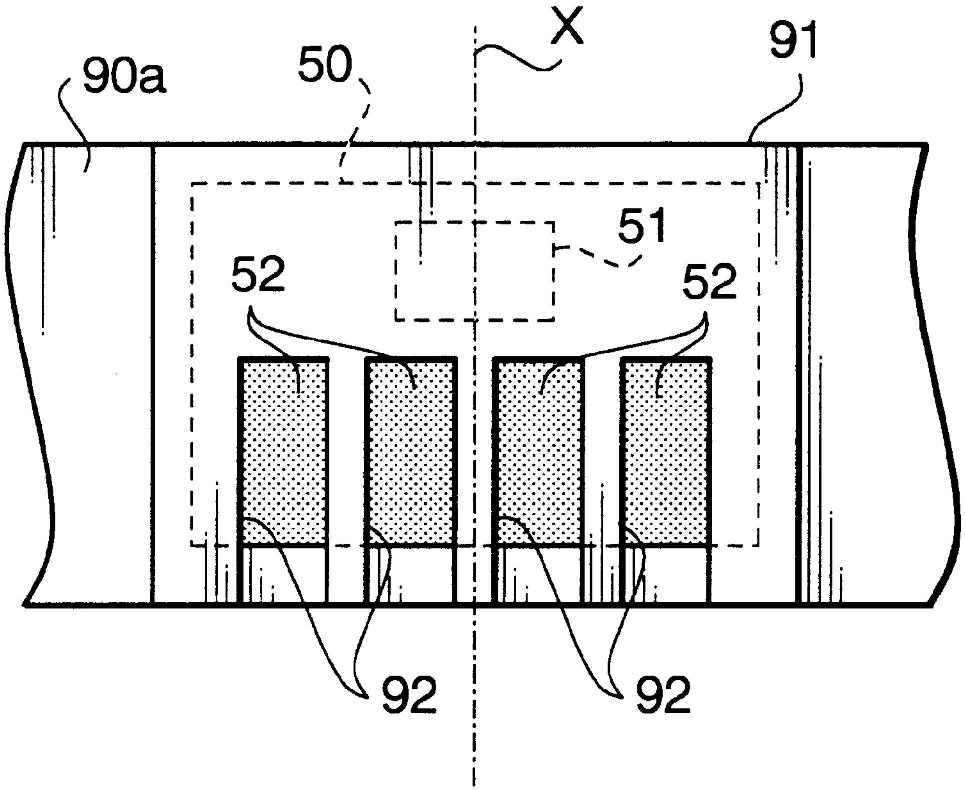
FIG. 11 is a partial front view showing an attaching portion of information storing section of the cartridge according to the third embodiment of the present invention.

As shown in FIG. 11, the respective electrodes 52 are horizontally arranged to be symmetrically with respect to a central axis X, which is the center in the width direction of the front surface portion 42*a*.

The attaching portion 91 has a plurality of opening portions 92 for exposure to be associated with the electrodes 52.

Figure 12:
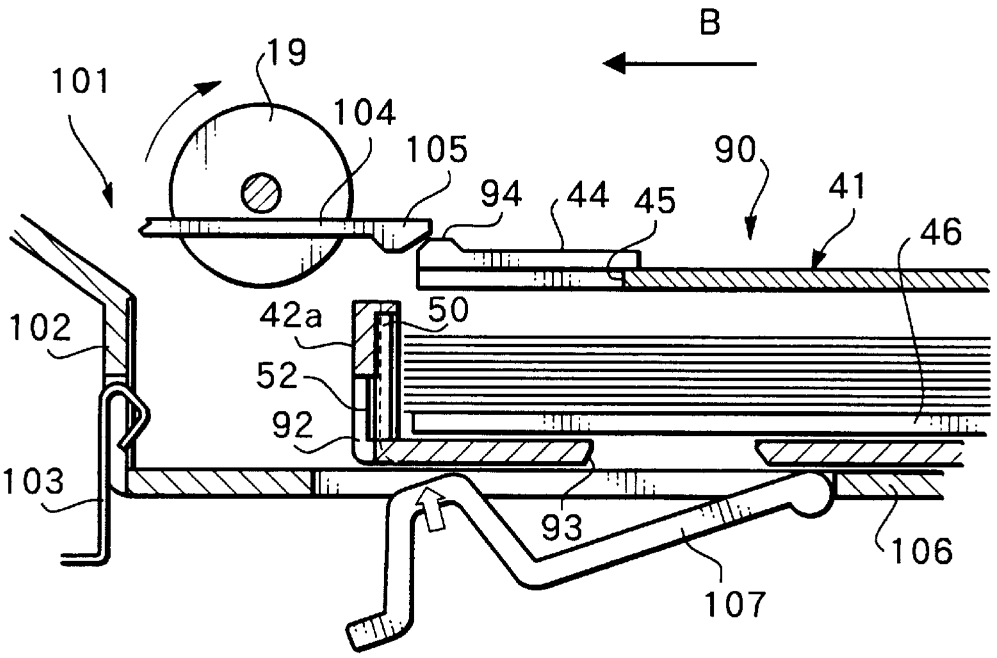
FIG. 12 is a partially vertical cross sectional view showing a state before the cartridge according to the third embodiment is attached to a cartridge attaching section of the printer.
Figure 13:
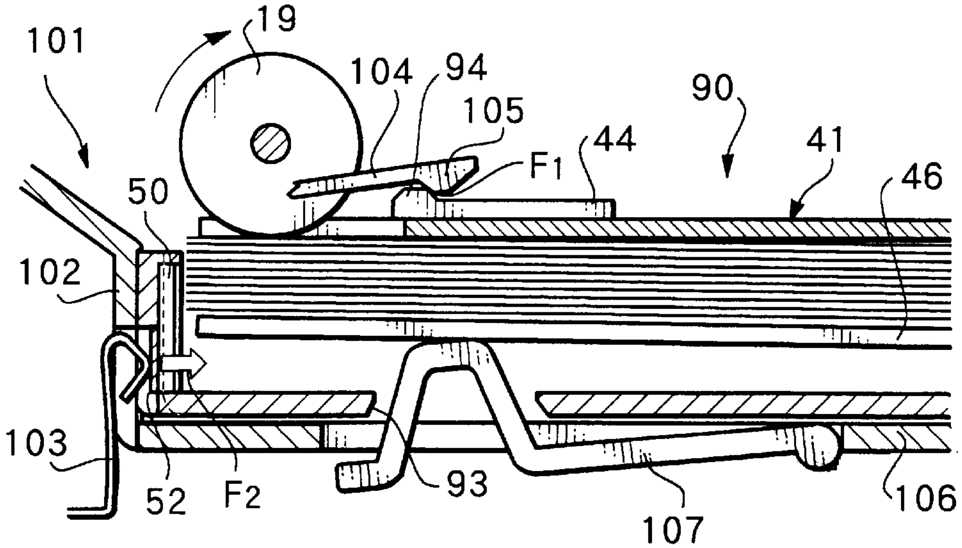
FIG. 13 is a partially vertical cross sectional view showing a state after the cartridge according to the third embodiment is attached to the cartridge attaching section of the printer.

Next, the following will explain a case in which the aforementioned cartridge 90 is attached to the printer. FIG. 12 is a partially vertical cross sectional view showing a state before the cartridge according to the third embodiment is attached to the cartridge attaching section of the printer. FIG. 13 is a partially vertical cross sectional view showing a state after the cartridge according to the third embodiment is attached to the cartridge attaching section of the printer.

The plurality of contact points 103 (four in this embodiment) is attached to the front wall portion 102 of the cartridge attaching section 101 of the printer. The contact points 103 have a spring structure in which they elastically deform. These contact points 103 are electrically connected to the central processing unit 31 shown in FIG. 3.

Also, in the cartridge attaching section 101, two hooks 104 are fixed at a slightly higher position with respective to both side edge portions of the upper side member 41 of the cartridge 90. A projection 105 is formed at the lower surface side of each hook 104. On the other hand, a lift lever 107 is provided in a bottom plate 106 of the cartridge attaching section 101.

If the cartridge 90 is inserted, the convex portion 94 of the shutter 44 comes in contact with the projection 105 of the hook 104 so that the shutter 44 slides. If the shutter 44 slides up to the limit, the projection 105 of the hook 104 mounts over the convex portion 94 as shown in FIG. 13. On the other hand, the top end portion of the lift lever 107 projects into the cartridge 90 through the through hole 93 so as to push up the lifter 46.

If the cartridge 90 is inserted to the cartridge attaching section 101 at the deepest position, the contact points 103 come in contact with the electrodes 52 so as to obtain electrical continuity.

Figure 14:
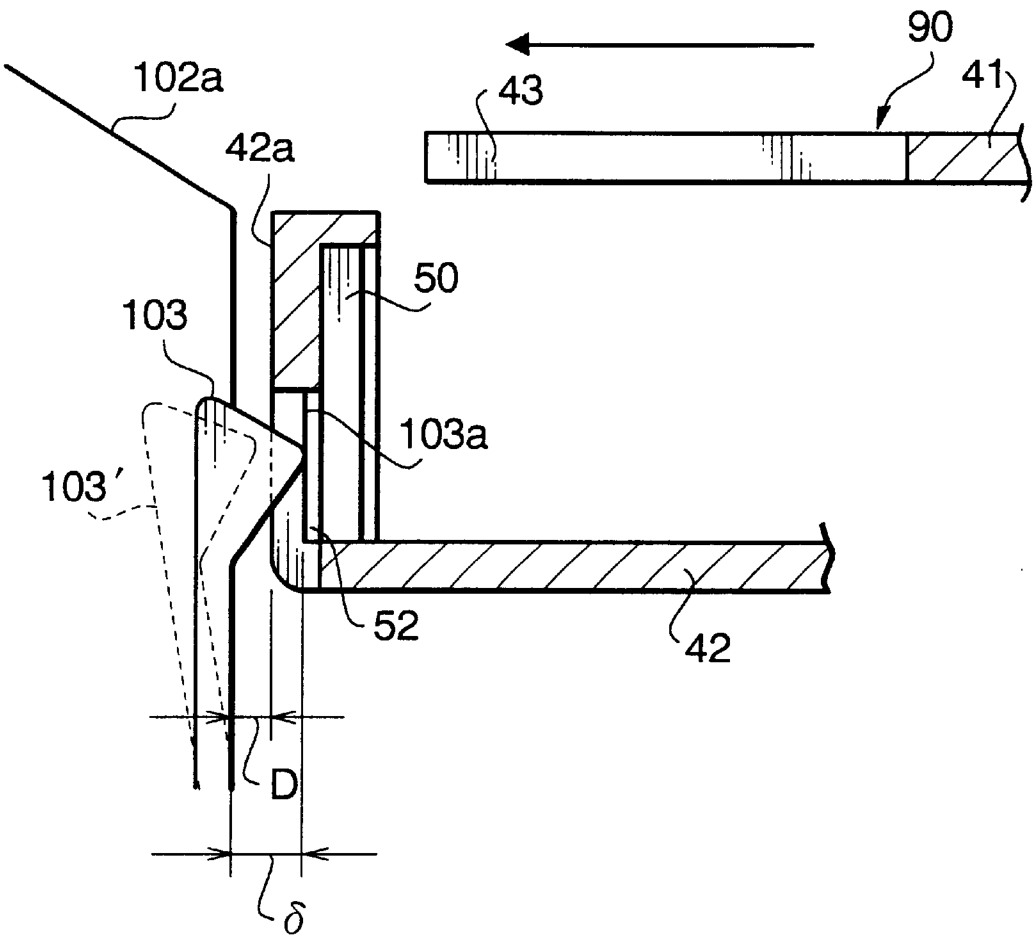
FIG. 14 is a schematic diagram showing a state that contact points come in contact with electrodes according to the third embodiment of the present invention.

FIG. 14 is a schematic diagram showing a state that contact points come in contact with electrodes. The contact points 103 project than a surface 102*a* of the front wall portion 102 to obtain contact pressure by its elasticity. An amount of projection δ thereof is set to, for example, 0.5 mm.

If the cartridge 90 is inserted, the cartridge 90 comes in contact with the top end portion 103*a* of the contact point 103. At this time, a gap D is generated between the front wall portion 102 and the front surface portion 42*a*. Moreover, If the cartridge 90 is inserted to the cartridge attaching section 101 at the deepest position, the front surface portion 42*a* abuts against the front wall portion 102, so that the cartridge 90 is fixed not to be moved backward by positioning means (not shown) separately. At this time, a contact point 103' is made flexible by the cartridge 90. Therefore, as already explained in the first embodiment, the central processing unit 31 of the printer shown in FIG. 3 outputs the read command to EEPROM 36. Then, if there is a response, the central processing unit 31 can detect the position of the cartridge 90 with accuracy of the gap D within the range of the amount of projection δ.

As mentioned above, according to the third embodiment, the electrode 52 is provided on the front surface portion 42*a* of the lower side member 42, namely, they are formed to be opposite to the contact points. For this reason, if the contact point 103 is correctly placed at a predetermined position, the electrode 52 can reach the predetermined position, and come in contact with the contact point 103. This makes it possible to position the cartridge 90 in the insertion and discharge directions with high accuracy. As a result, incapability of transferring the recording paper, occurrence of the paper jam, and generation of distortion in the printed image can be prevented.

Moreover, as shown in FIG. 11, the respective electrodes 52 of the information storing section 50 are arranged to be symmetrical with respect to the central axis X, which is the center in the width direction of the front surface portion 42*a*. In this case, contact pressure of the respective electrodes 52 and that of the respective contact points 103 can be equalized. This makes it possible to obtain stable electrical contact between the printer and the cartridge so as to improve connection reliability.

Fourth embodiment

Figure 15:
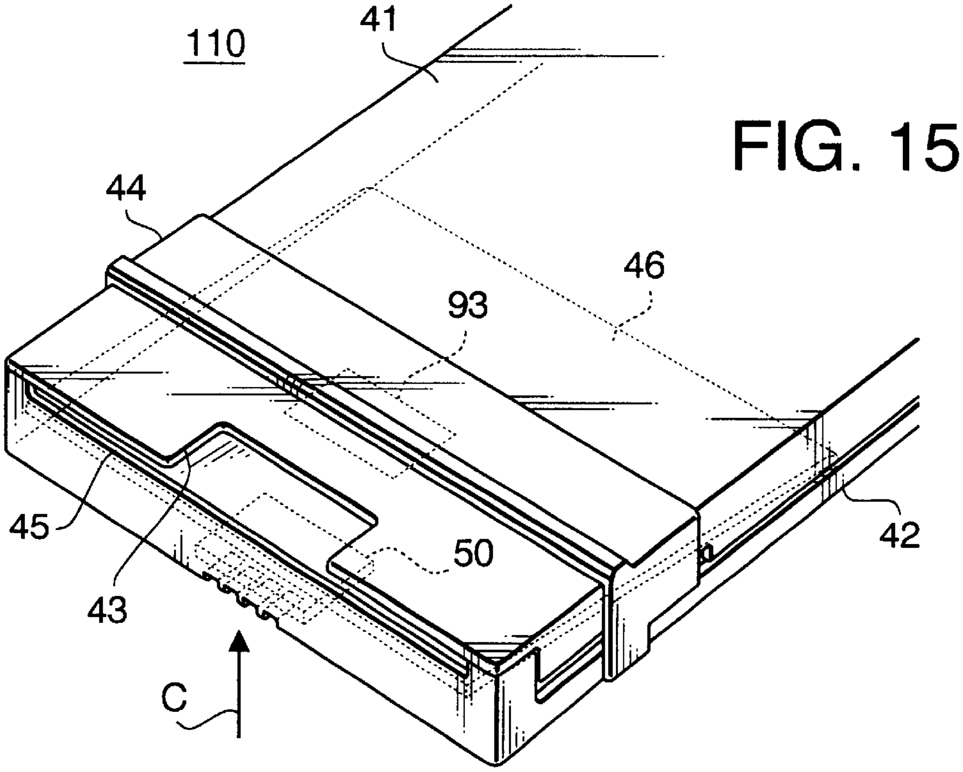
FIG. 15 is a perspective view showing a cartridge according to a fourth embodiment of the present invention.
Figure 16:
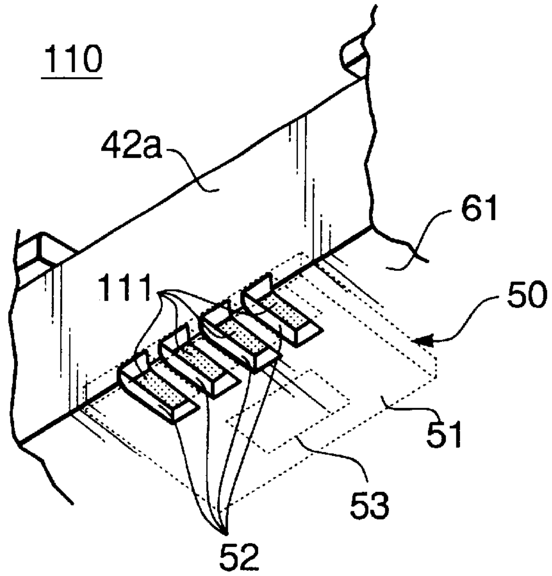
FIG. 16 is a partially enlarged view of the cartridge seen from a direction of an arrow C of FIG. 15.

Next, the following will explain the cartridge having the electrodes of the information printing section on the back portion. FIG. 15 is a perspective view showing a cartridge according to a fourth embodiment of the present invention. FIG. 16 is a partially enlarged view of the cartridge seen from a direction of an arrow C of FIG. 15. The same reference numerals are added to the portions common to the second and third embodiments, and the explanation is omitted.

As shown in FIG. 15, in cartridge 110, the information storing section 50 is provided on the bottom surface of the lower side member 42 and at substantially the center of the front surface side in a state that the electrodes 52 are arranged downwardly. In other words, the electrodes 52 are arranged at the lower portion of the opening portion 45. Therefore, when the cartridge 110 is completely inserted, the electrodes 52 are positioned at the lower portion of the transferring roller As shown in FIG. 16, an insertion groove 111 to which the contact point on the printer side is inserted from the front surface side is formed for each electrode 52 on the bottom plate 61 of the lower side member 42. The insertion grooves 111 extend from the front surface 42*a* of the lower side member 42 to at least the electrodes 52 along the inserting and discharging directions of the cartridge 110. The insertion grooves 111 are formed by notching the bottom plate 61 along its entire length. In other words, the insertion grooves 111 are recessed from surface of the bottom plate 61. This prevents reduction in reliability caused by deterioration of the electrodes due to dirt and breakage of EEPROM 3 from static electricity without touching the electrodes 52 directly. The respective grooves are substantially horizontally formed along the insertion and discharge directions.

Figure 17:
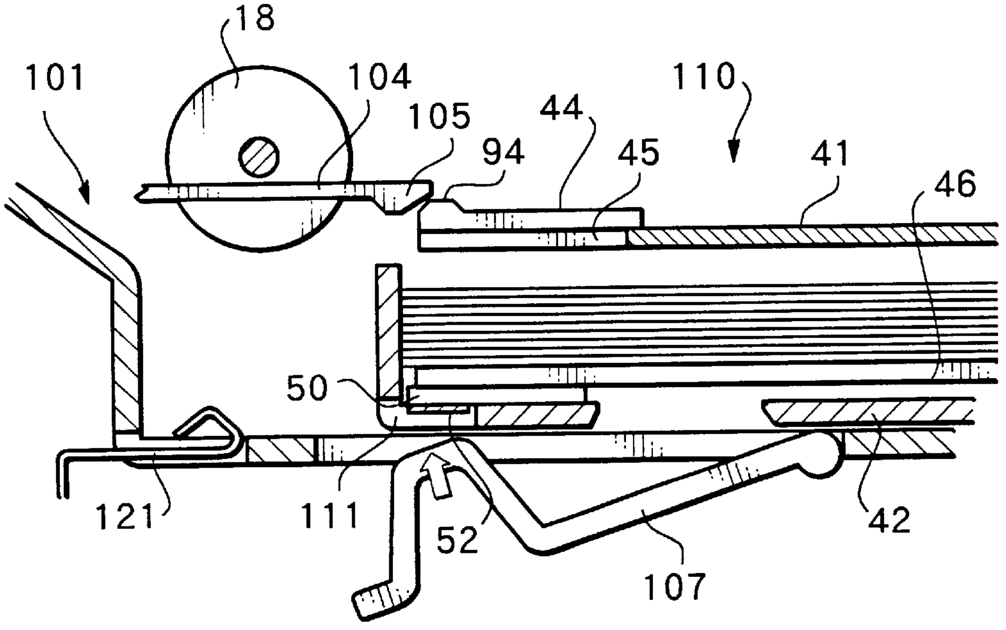
FIG. 17 is a partially vertical cross sectional view showing a state before the cartridge according to the fourth embodiment is attached to a cartridge attaching section of the printer.
Figure 18:
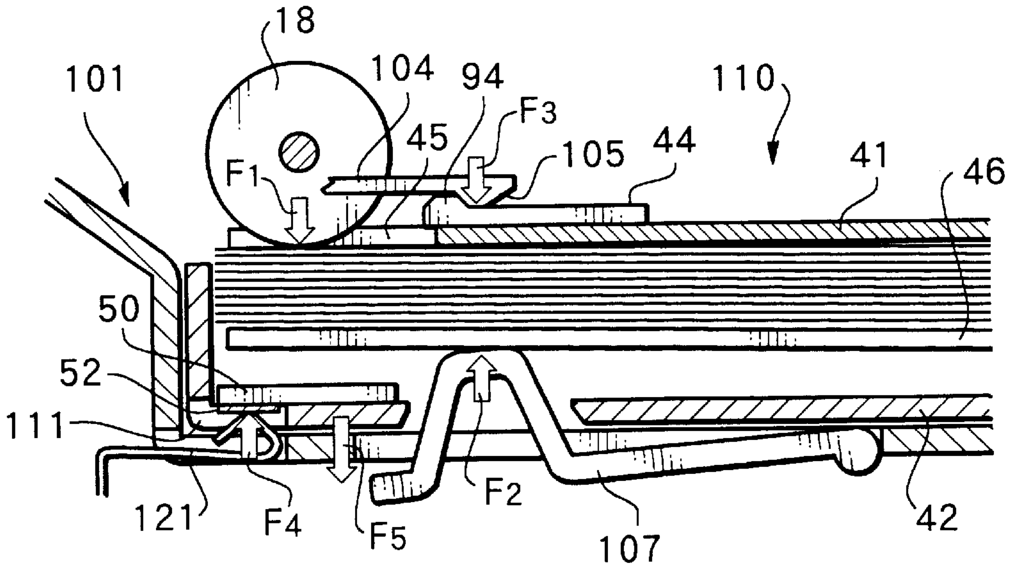
FIG. 18 is a partially vertical cross sectional view showing a state after the cartridge according to the fourth embodiment is attached to the cartridge attaching section of the printer.

Next, the following will explain a case in which the aforementioned cartridge 110 is attached to the printer. FIG. 17 is a partially vertical cross sectional view showing a state before the cartridge according to the fourth embodiment is attached to a cartridge attaching section of the printer. FIG. 18 is a partially vertical cross sectional view showing a state after the cartridge according to the fourth embodiment is attached to the cartridge attaching section of the printer.

If the cartridge 110 is inserted to the cartridge attaching section 101, the convex portion 94 of the shutter 44 comes in contact with the projection 105 of the hook 104 so that the shutter 44 slides. If the shutter 44 slides up to the limit, the projection 105 of the hook 104 mounts over the convex portion 94 as shown in FIG. 18.

If the cartridge 110 is inserted to the cartridge attaching section 101 at the deepest position, a contact point 121 is inserted to the insertion groove 111 and comes in contact with the electrode 52 so as to obtain electrical continuity. At this time, the resultant force $F_3$ in which the projection 105 of the hook 104 presses down the shutter 44 and cartridge 110's own weight $F_5$ is larger than pressing force $F_4$ of the contact point 121. For this reason, the cartridge 111 is not lifted by the pressing force of the contact point 121. Also, since pressing force $F_4$ can be increased within the range satisfying the relationship of $F_3+F_5>F_4$, the contact pressure between the contact point 121 and the electrode 52 can be improved. This results in an increase in reliability of the connection between the cartridge side and the printer side.

Similar to the second embodiment, since the insertion grooves 111 are recessed from the surface of the bottom plate 61, flexibility of the contact points 121 generated at the inserting time is relatively lessened, so that the contact pressure can be restrained. This results in an increase in life of the contact points on the printer side. Particularly, the insertion grooves 111 are formed by notching the bottom plate 61 along its entire length. For this reason, the face with which the contact points 121 of the insertion grooves 111 come in contact is substantially flush with the electrodes 52. For this reason, flexibility of the contact points 121 generated at the inserting time is favorable since the flexibility thereof becomes substantially the same as the case in which the contact points come in contact with the electrodes 52.

Furthermore, since the electrodes 52 are positioned in the dented insertion grooves 111, it is possible to prevent the reduction in reliability caused by deterioration of the electrodes due to dirt and breakage of EEPROM 36 due to static electricity without touching the electrodes 52.

In the aforementioned first to fourth embodiments, EEPROM was used as information storing means. However, according to the present invention, information storing means is not limited to EEPROM. Moreover, if a battery for backup is mounted on the cartridge, a volatile semiconductor memory can be used.

In the aforementioned first to fourth embodiments, as a data inputting/outputting section for inputting/outputting data from/to storing means, the electrodes were formed in the cartridge and electrical continuity was obtained by contacting the contact points on the printer side. However, a data inputting/outputting section of non-contact type such as an infrared port may be used.

Also, the contact points are not limited to the sprint structure. For example, pin typed contact points that can freely come in and come out by the spring provided at the backward portion may be used. In this case, the electrodes are arranged to be exposed to insertion holes formed on the wall of the cartridge.

Moreover, regarding the information storing section, various setting methods such as a method in which the information storing section is combined with the cartridge can be adopted.

Also, the aforementioned first to fourth embodiments explained the cartridge for sheet-like recording paper. However, the recording paper of roll type may be used.

As mentioned above, according to the present invention, there is provided a case for a recording medium in which the recording medium can be isolated from light and moisture and information can be stored and put to use. Also, it is possible to detect whether or not the case for a recording medium is normally set with a simple structure. For this reason, the preservation of the recording medium can be improved, value can be added to the case for a recording medium, and generation of trouble by set failure can be prevented.

The present invention is not limited to the above described embodiments, and various variations and modifications may be possible without departing from the scope of the present invention.

This application is based on the Japanese Patent Application No.HEI 10-168734 filed on Jun. 16, 1998, entire content of which is expressly incorporated by reference herein.

What is claimed is:

1. A container for receiving a photofixable-recording medium, the container being attachable to and detachable from a printer, the container comprising:

a body configured to contain discrete sheets of the photofixable-recording medium, the discrete sheets of the photofixable-recording medium being fed to the printer to print image data on the photofixable recording medium;

a memory configured to store data regarding the photofixable-recording medium in said body; and an output section that outputs the data from the memory to the printer, the data being displayable on the printer.

2. The container according to claim 1, said body comprising a light shielding casing.

3. The container according to claim 1, said body comprising a moisture-proof casing.

4. The container according to claim 1, said body comprising a low water permeability casing.

5. The container according to claim 1, said memory comprising a nonvolatile semiconductor memory.

6. The container according to claim 1, the data in said memory comprising at least one of an amount of the photofixable recording medium and a size of the photofixable recording medium.

7. The container according to claim 1, said body comprising a double wall structure having an outer wall and an inner wall, and said memory is provided between the outer wall and the inner wall.

8. A container for receiving a recording medium comprising:

a body configured to contain the recording medium;

a memory configured to store data, said memory being attached to said body; and a data inputter/outputter that inputs and outputs data to and from said memory;

wherein said data inputter/outputter comprises an electrode unit which includes plurality of electrodes, each of said plurality electrodes being provided in a groove in said body and having a predetermined depth, each of said plurality of grooves extending along an insertion direction of said body from a front surface of said body toward a rear surface of said body.

9. A printing apparatus including the container according to claim 1, comprising;

a printer configured to print the image data on a discrete sheet of the photofixable-recording medium which fed from said body; and a display configured to display the data which is output from said memory.

* * * * *